Oct. 12, 1948.  E. KREBS  2,451,033
FRICTION WHEEL REGULATING GEAR
Filed Aug. 13, 1945  2 Sheets-Sheet 1

INVENTOR
ERNST KREBS
ATTORNEY

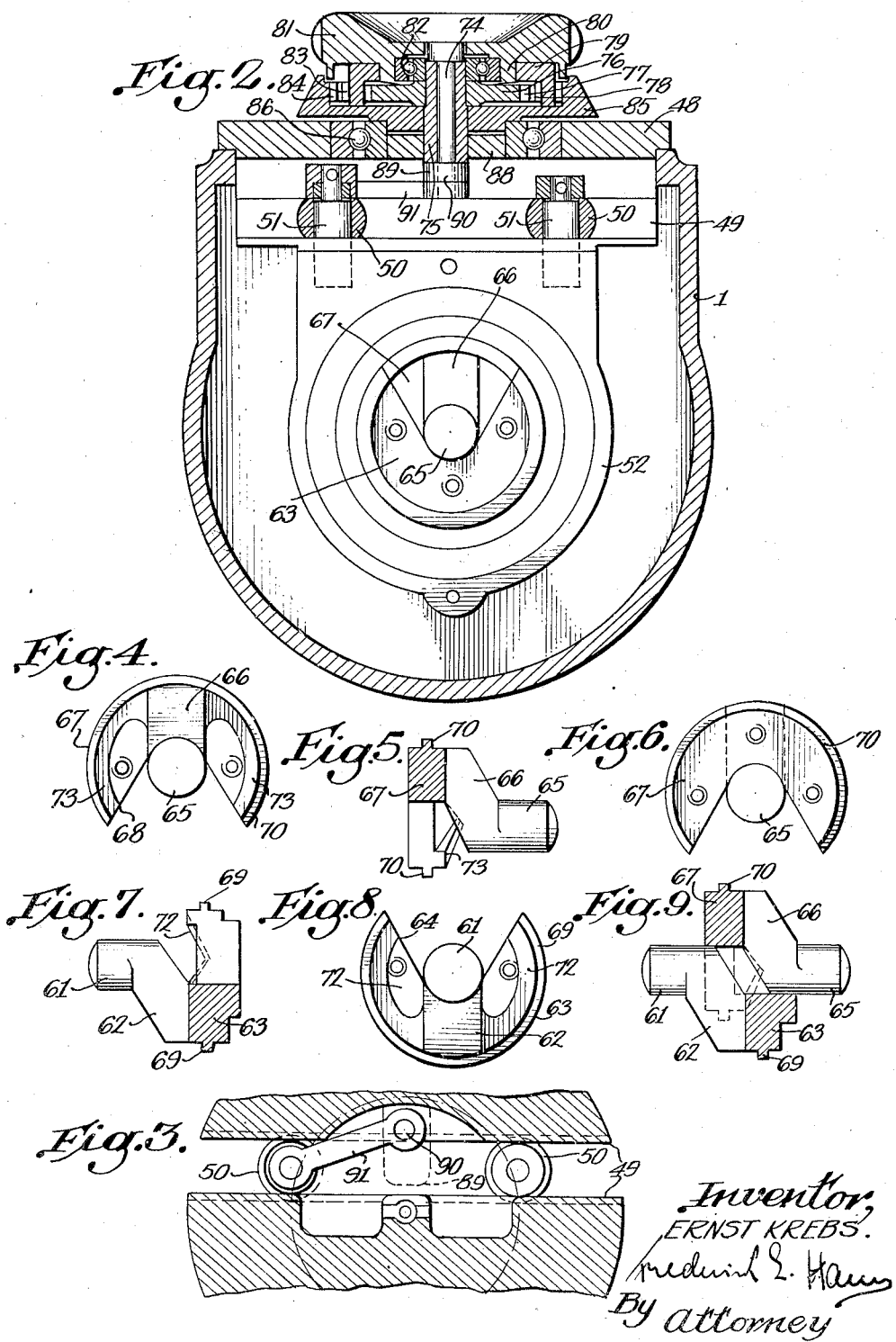

Patented Oct. 12, 1948

2,451,033

UNITED STATES PATENT OFFICE 2,451,033

FRICTION-WHEEL REGULATING GEAR

Ernst Krebs, Zurich, Switzerland

Application August 13, 1945, Serial No. 610,439½
In Switzerland August 28, 1944

10 Claims. (Cl. 74—200)

This invention relates to friction-wheel regulating gears.

There are already known friction-wheel regulating gears in which a friction-wheel having a flange on both sides is arranged between two cone discs which are spaced apart, the said flanges being arranged to face the faces of the two discs and keeping to the same track. The alteration of the transmission ratio is effected by moving the friction wheel, the points of contact being displaced on a track which passes along the faces of the discs and through the centers. This arrangement makes possible a construction with comparatively small dimensions and favourable conditions for being fitted into machines and the like. However, considerable difficulties are involved in the production and pressing of the two cone discs to the friction wheel which, in order to avoid an unnecessarily large amount of wear of the friction wheel and the cone discs, should depend upon, i. e., be variable with, the magnitude of the transmitted torque. Special additional devices have to be provided which produce the pressing of the cone discs to the friction wheel and ensure the starting of the gear in every position. As a result, the construction of such friction-wheel regulating gears, which are very efficient in themselves, is considerably complicated. This very important disadvantage is eliminated by the present invention.

The subject matter of the present invention is a friction wheel regulating gear having two co-axial spaced cone discs one of which is driven by a driving machine whilst the other drives the shaft which is to be driven, between which cone discs there is displaceably arranged a friction-wheel transmission device for the purpose of altering the gear ratio, the said gear being characterised by the feature that its driving-side part, its driven-side part and the friction-wheel transmission device are each constructed as a structural unit, and that the friction-wheel transmission device has two discs, each with a friction-bead, which discs are coupled together with regard to rotation but are axially displaceable in relation to each other. One of the beads lies on a point on a conical-surface line of the driving-side cone disc and the other of the beads lies on a point on a conical-surface line of the driven-side cone disc, which conical surface line lies crosswise, opposite and parallel to the conical-surface line of the driven-side cone disc. The beads are urged apart and against the two cone discs by spring means, and the mutually displaceable discs are mounted in a supporting ring, which is arranged on rollers that are displaceably guided in a guide which is parallel to the conical-surface lines of the cone discs on which lines the contact with the cone discs takes place, there being provided for altering the gear ratio a shifting device, by means of which the rollers which carry the supporting ring can be displaced in their guide within two limiting positions.

Advantageously there is provided, both on the driving-side part and on the driven-side part, a transmission gear which enables a high-speed engine to be provided as the driving machine.

The invention is illustrated by way of example by the accompanying drawings of which—

Fig. 2 is a section on the line II—II of Fig. 1, the driving device for the shifting device being omitted;

Fig. 3 is a section on the line III—III of Fig. 2;

Fig. 4 is an elevation of one clutch member in the axial direction;

Fig. 5 is a corresponding side elevation, partly in section;

Fig. 6 is an elevation of the same clutch member from the side opposite to that of Fig. 4;

Fig. 7 is a side elevation of the other clutch member, partly in section;

Fig. 8 is a corresponding elevation in the axial direction; and

Fig. 9 is a side elevation of the two clutch members in engagement with each other, partly in section.

Figure 1:
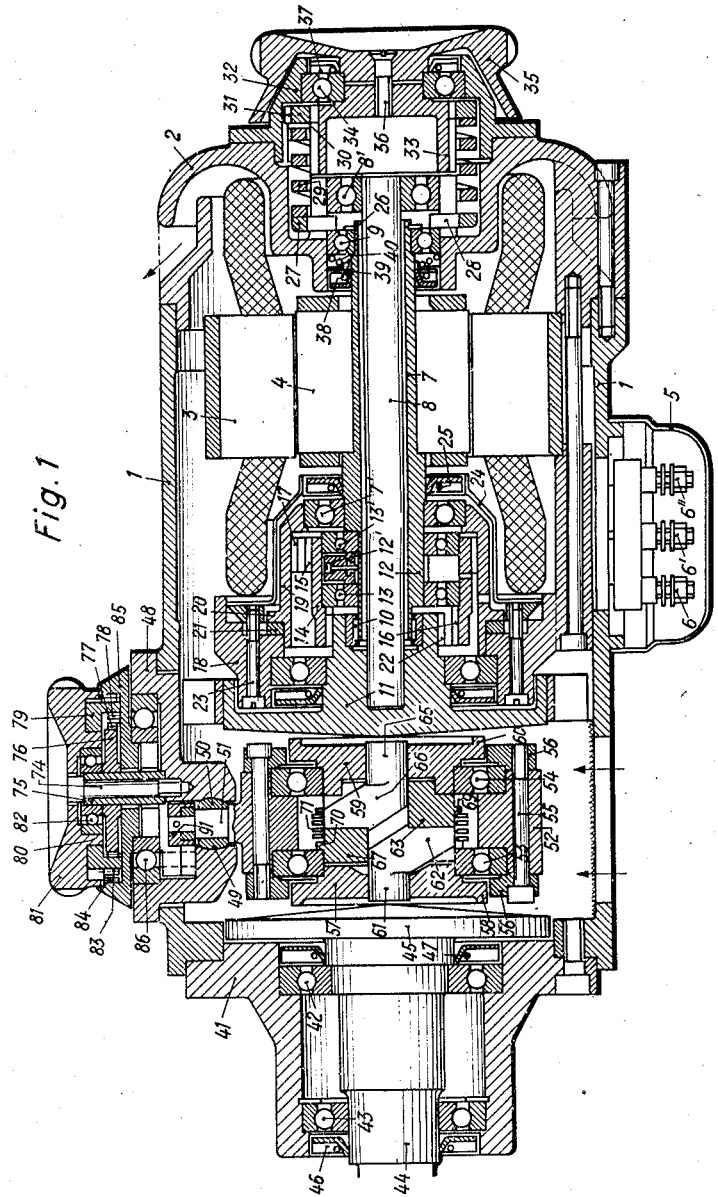
Fig. 1 is an axial section through a friction-wheel regulating gear.

I denotes a casing which is closed by a lid 2 on one side, on the right hand side in the embodiment represented. In the embodiment represented, that is to say on the right hand side, there is accommodated in this casing I an electromotor, the stator of which is denoted by 3 and the rotor of which is denoted by 4, and which electromotor is connected to a power line by means of the terminals 6, 6' and 6", which are arranged in a box 5 on the outside of the casing I. The rotor 4 of the electromotor is mounted and keyed on a sleeve 7, through which a shaft 8 is passed so as to be freely rotatable, one end of which shaft is mounted by means of a ball bearing 8' in the lid 2. One end of the sleeve 7 is mounted in the lid 2 in a ball-bearing 9 and the other end is mounted in a needle bearing 10 in the hub of cone disc 11 which is rigidly mounted on the end of the shaft 8. In front of the needle bearing 10, the sleeve 7 has an eccentric extension 12, on which a ring 14 is mounted on two ball bearings 13 and 13'. Ring 14 has an external ring of teeth 15 and an internal ring of teeth 16. For the purpose of balancing the mass of the eccentric extension 12, an eccentric ring 12' is fixed on the sleeve 7 between the ball bearings 13 and 13'. The external ring of teeth 15 of the eccentrically mounted ring 14 engages with an internal ring of teeth 17 of a bell-shaped supporting ring 18, which is provided inside the casing 1, and a rotary toothed wheel 19 which is mounted on the sleeve 7 by means of a ball bearing 7'. The rotary toothed wheel 19 engages in the supporting ring 18 and it has, on its periphery, a somewhat reduced flange 20 which is coated with a brake lining 21.

The internal ring of teeth 16 of the ring 14 engages with a ring of teeth 22 on the hub of the cone disc 11. Fixed to the supporting ring 18 by means of screws 23 is a sheet-metal casing 24 which encloses the rotary toothed wheel 19. The open end of casing 24 through which the sleeve 7 passes, is closed by a packing 25. Acting on the ball bearing 9, the outer ring of which is displaceably mounted in the lid 2 and which is secured on the sleeve 7 by a spring washer 26, against axial displacement, is an annular pressure plate 27 which has two inwardly extending projections 28 which lie in an outwardly open chamber of the lid 2. This pressure plate 27 is acted upon by a compression spring 29 which bears against a screw-threaded ring 30 which is arranged, so as to be axially displaceable but secured against rotation by means of a projection 31, in a casing 32 which closes the outside of the chamber of the lid 2. The threaded ring 30 is screwed on to a threaded sleeve 33 which is mounted in the casing 32 in a ball bearing 34. An adjusting wheel 35, which is provided with a scale, is connected with the threaded sleeve 33 by means of a screw 36. The open end of the casing 32 is closed by a packing 37 which slides on the hub of the adjusting wheel 35. A packing 38 is inserted inside the axial opening of the lid 2, through which opening the sleeve 7 and the shaft 8 pass. Bearing against a plate 39, which is likewise inserted into this opening, is a compression spring 40 which acts upon the ball bearing 9 and tends to push it, together with the sleeve 7, outwards, i. e., in the embodiment shown, to the right.

On the rotation of the rotor 4 and, consequently, of the sleeve 7, the external ring of teeth 15 of the ring 14 rolls on the internal ring of teeth 17 of the toothed wheel 19, with the result that the ring 14 is rotated. By means of its internal ring of teeth 16, which engages the ring of teeth 22 of the cone disc 11, the latter is likewise rotated. This driving arrangement is nothing more than a reduction gear by means of which the rotation of the rotor 4 is transmitted reduced to the cone disc 11. The loading of the compression spring 29, which can be regulated by means of the adjusting wheel 35, effects the pressing of the flange 20 of the toothed wheel 19 against the supporting ring 18. There is thus provided a preventive against overloading, since the toothed wheel 19 is no longer kept stationary but rotates when the transmission torque exceeds a given value. If the compression spring 29 is completely relieved by means of the adjusting hand wheel 35, the sleeve 7 and, with it, the toothed wheel 19 are displaced in such a manner by the action of the compression spring 40 that the brake lining 21 of the flange 20 is lifted from the supporting ring 18. Thus, an idle running is produced. In this way, the transmission torque can be adjusted from approximately zero up to a maximum value.

The other end of the casing 1, which end is opposite the lid 2, is closed by a lid 41 in which the driven shaft 44 is mounted on ball bearings 42 and 43. A cone disc 45, which is symmetrical with regard to the cone disc 11, is mounted on the end, in the casing 1, of this shaft 44 which is co-axial with the shaft 8.

In the lid 41, the shaft 44 is closed outwardly by a packing 46 and inwardly by a packing 47. Obviously, a reduction gearing could be provided also between the cone disc 45 and the shaft 44.

The transmission of the rotary movement of the driving-side cone disc 11 to the driven-side cone disc 45 is effected by means of a friction-wheel transmitting device, which is arranged in the interspace between these cone discs 11 and 45 and which is constructed in the manner to be described.

The casing 1 has at the top in its central part, i. e. above the cone discs 11 and 45, an aperture which is closed by a lid 48. On the underside of this lid 48 there is provided a guide 49, which is parallel to the base planes of the cone discs 11 and 45 and in which two rollers 50 are guided so as to be rotatable about the axis of the guide 49 and to be displaceable in the latter. In these rollers 50 there are inserted journals 51 on the bottom ends of which there is mounted a supporting ring 52, on the two sides of which there are arranged two ball bearings 53 and 54, which are held by means of two rings 56, which are connected together by means of screws 55. In an inner ball race of the ball bearing 53 there is fixed a disc 57, which has a friction-bead 58 on its outside surface which faces the cone disc 45. In the inner ball race of the ball bearing 54, there is mounted, so as to be axially displaceable, a disc 59 which has a friction-bead 60 on its outside surface, which faces the cone disc 11. A journal 61 of a clutch member is co-axially mounted in the disc 57. On this journal 61 there is mounted inside the disc 57 a part 62, which is bent off and on which rests a flange 63 which has a sector 64 which is connected by screws with the disc 50. In the same way, the pin 65 of a similar clutch member, which likewise has a bent off part 66, on which rests a flange 67 with a sector 68, which is connected with the disc 57 by means of screws. These two clutch members engage with each other in such a manner that the bent off part 66 of one clutch member lies in the sector 64 of the other clutch member and vice versa; and the flanges 63 and 67 engage on the inside. The flanges 63 and 67 have on their peripheries the collars 69 and 70 respectively, between which a compression spring 71 is inserted, which causes the clutch member inserted into the disc 59 and, with it, the disc 59 itself to be pressed away from the disc 57, i. e., towards the cone disc 11. On their engaging surfaces, the flanges 63 and 67 have cams 72 and 73 respectively, which are bounded by aligned screw surfaces and by means of which they engage in each other and thus clutch the discs 57 and 59 with each other. The friction-bead 60 of the disc 59 lies on an approximately horizontal conical-surface line of the cone disc 11 and the friction-bead of the disc 57 lies on the conical-surface line of the cone disc 45, which casing line lies crosswise opposite the former casing line. The compression spring 71 effects the initial pressing of the friction-beads 58 and 60 to the cone discs 45 and 11, and thus ensures the starting of the gear. During the operation of the gear, the cams 72 and 73, which engage in each other and are bounded by screw surfaces of corresponding pitch, effect a pressing apart of the clutch members, and, consequently, of the discs 57 and 59 with their friction-beads 58 and 60, in dependence upon the magnitude of the transmitted torque, so that the pressing of the friction-beads 58 and 60 to the cone discs 11 and 45 is always effected automatically independently of the direction of rotation of the gearing and in accordance with the momentary requirements, with the result that, on the one hand, slip-free transmission of the rotary movement is assured and, on the other hand, excessive wear of the cone discs 11 and 45 and of the friction-beads 58 and 60 are avoided. The flanges 63 and 67 instead of being connected with the discs 59 and 57 respectively by screws, could be provided on their peripheries with screw threads and screwed into corresponding screw threads provided in the discs 59 and 57 respectively.

For the purpose of altering the gear ratio of the friction-wheel regulating gear, the sliding members 50 and, consequently, the whole friction-wheel transmission device which is arranged between the cone discs 11 and 45 are displaced in their guide 49. This can be effected by means of, for example, a screw spindle, which is axially undisplaceably mounted in a part of the casing. This displacement is advantageously effected with the aid of a device such as is represented in the drawings and now to be described.

In the lid 48, offset to the guide 49, there is fixed a journal 74 on which a sleeve 75 is fixed. Rigidly connected with this sleeve 75 is a disc 76, which has a ring of teeth 77, with which an internal ring of teeth 78 of a ring 79 engages. The ring 79 is mounted so as to be freely rotatable on an eccentric which is formed by the hub 80 of a handwheel 81, which is mounted by means of a ball bearing 82 on the sleeve 75, so as to be freely rotatable. It has an external ring of teeth 83, which engages with an internal ring of teeth 84 of a disc 85, which is mounted so as to be freely rotatable on the sleeve 75 and in a ball bearing 86. With the aid of this disc 85, a crank disc 88, which is likewise mounted in the ball bearing 86, is rigidly connected by screws 87, which crank disc has a crank 89 that is movable in a space in the lid 48. On this crank 89 there is mounted a crank pin 90 on which is mounted a connecting rod 91, the other end of which is hinged to the upwardly projecting narrowed end of the journal 41 in one roller 40. On rotating the handwheel 81, the ring 79, which is mounted on the eccentric hub 80 of the handwheel 81, rolls on the ring of teeth 77 and of the stationary disc 76 and through its outer ring of teeth 83 and the inner ring of teeth 84 of the disc 85, which inner ring of teeth is in engagement with the outer ring of teeth 83, rotates the disc 85. This driving arrangement is nothing more than a revolution-reducing device which is self-stopping, so that the shifting of the bearing ring by any forces acting thereon is rendered impossible. The crank disc 88 is driven and, by means of the connecting rod 91, the journal 51 with its roller 50 and, consequently, the whole friction-wheel transmission device are displaced in the guide 49. The limiting positions are determined by the crank 89 and they correspond to the outermost and the innermost points of contact of the friction-bead 60 on the conical-surface line of the cone disc 11 or of the friction-bead 58 on the conical-surface line of the cone disc 45. The result of the circumstance that the displacement of the friction-wheel transmission device is effected through a crank is that this displacement does not take place uniformly between the limiting positions, but as a sine function. This has the great advantage that, near the limiting positions of the friction-wheel transmission device, where a small displacement corresponds to a great alteration in the gear ratio of the gearing, there corresponds, to a particular rotation of the handwheel 81, a correspondingly smaller displacement of the friction-wheel transmission device than an equally large rotation of the handwheel 81 in the central part of the range of regulation. A balance is consequently created in such a manner that, to a particular rotation of the handwheel 81, there corresponds an approximately equal alteration of the gear ratio in the whole range of regulation of the gearing. The two limiting positions correspond to gear ratios of 1:7 and 1:—7, that is to say the number of revolutions per minute of the cone disc 11 can be transmitted to the cone disc 45 within the limits 1:7 stepped up or stepped down. Accordingly, in the case represented, there is produced, with 2,800 revolutions per minute of the electromotor and with a stepping down of about 5.8:1 on the driving side, a range of regulations of about 3,500 to 70 revolutions per minute. For the shifting from one into the other limiting position, about four revolutions of the handwheel 81 are necessary in the case of the device represented. In this way a very accurate adjustment is rendered possible. Naturally, the adjustment gear ratio may differ as desired. Advantageously, there is provided on the disc 85 a scale or like indicating device (not represented in the drawings), on which the particular adjustment of the gear ratio of the friction-wheel regulating gear can be read by means of an index provided on the lid.

Owing to the circumstance that the rollers 50 are rotatable about the axis of the guide 49, the result is obtained that the friction-wheel transmission device can be rocked somewhat between the cone discs 11 and 45, so that the friction-beads 58 and 60 can always bear with certainty on the cone discs 11 and 45 with the same pressure.

On the periphery of the cone disc 11 there is arranged a fan blade device 92, which sucks air through an aperture 93 provided in the casing 1 and expels it through an aperture 94 provided in the lid 2, or vice versa, in accordance with the direction of rotation. In this way, the whole casing 1 is ventilated.

A special advantage of the friction-wheel regulating gear, according to the invention, is to be seen in the fact that its driving-side part, its driven-side part and the friction-wheel transmission device between these parts each form a structural unit. In this way, not only are the whole construction and assembly simplified, but the possibility is created of fitting both the driving-side part as well as the driven-side part as desired in a machine, or to construct them as a part of such a machine. It is unnecessary for the casing to be constructed as a unitary structure; on the contrary, it may be composed of two or three parts.

What I claim is:

1. A friction-wheel regulating gear comprising two coaxial spaced cone discs, one of said cone discs being adapted to be driven by a driving machine and the other of said cone discs being adapted to drive a driving shaft, a friction-wheel transmission device adapted to alter the gear ratio and displaceably arranged between said discs, the driving-side part and the driven-side part of said regulating gear and said friction-wheel transmission device being each constructed as a structural unit, said friction-wheel transmission device comprising two discs each with a friction-bead and coupled together with regard to rotation but axially displaceable in relation to each other, one of said beads lying on a point on a conical-surface line of the driving-side cone disc and the other of said beads lying on a point on a conical-surface line of the driven-side cone disc which latter conical-surface line lies opposite and parallel to said conical-surface line of the driving-side cone disc, spring means for urging said beads apart and against said two cone discs, contact of said beads with said cone discs being adapted to take place on said conical-surface lines, a supporting ring in which said discs are mounted, rollers on which said supporting ring is arranged, a guide which is parallel to said conical-surface lines of said cone discs and in which said rollers are adapted to be displaceably guided, and a shifting device adapted to displace said rollers in said guide within two limiting positions and thus to alter the gear ratio.

2. A friction-wheel regulating gear comprising two coaxial spaced cone discs, one of said cone discs being adapted to be driven by a driving machine and the other of said cone discs being adapted to drive a driving shaft, a friction-wheel transmission device adapted to alter the gear ratio and displaceably arranged between said discs, the driving-side part and the driven-side part of said regulating gear and said friction-wheel transmission device being each constructed as a structural unit, said friction-wheel transmission device comprising two discs each with a friction-bead and coupled together with regard to rotation but axially displaceable in relation to each other, one of said beads lying on a point on a conical-surface line of the driving-side cone disc and the other of said beads lying on a point on a conical-surface line of the driven-side cone disc which latter conical-surface line lies opposite and parallel to said conical-surface line of the driving-side cone disc, spring means for urging said beads apart against said two cone discs, contact of said beads with said cone discs being adapted to take place on said conical-surface lines, a supporting ring in which said discs are mounted, rollers on which said supporting ring is arranged, a guide which is parallel to said conical-surface lines of said cone discs and in which said rollers are adapted to be displaceably guided, a shifting device adapted to displace said rollers in said guide within two limiting positions and thus to alter the gear ratio, a clutch member rigidly connected with each of said displaceable discs, and a cam for each of said clutch members whereby said clutch members are caused to engage in each other, said cams being bounded by screw surfaces which continuously merge into each other and lie on each other and said clutch members being adapted to clutch said two displaceable discs in such a manner that said clutch members are pressed apart by means of the screw surfaces of said cams in dependence upon the magnitude of the transmitted torque.

3. A friction-wheel regulating gear comprising two coaxial spaced cone discs, one of said cone discs being adapted to be driven by a driving machine and the other of said cone discs being adapted to drive a driving shaft, a friction-wheel transmission device adapted to alter the gear ratio and displaceably arranged between said discs, the driving-side part and the driven-side part of said regulating gear and said friction-wheel transmission device being each constructed as a structural unit, said friction-wheel transmission device comprising two discs each with a friction-bead and coupled together with regard to rotation but axially displaceable in relation to each other, one of said beads lying on a point on a conical-surface line of the driving-side cone disc and the other of said beads lying on a point on a conical-surface line of the driven-side cone disc which latter conical-surface line lies opposite and parallel to said conical-surface line of the driving-side cone disc, spring means for urging said beads apart against said two cone discs, contact of said beads with said cone discs being adapted to take place on said conical-surface lines, a supporting ring in which said discs are mounted, rollers on which said supporting ring is arranged, a guide which is parallel to said conical-surface lines of said cone discs and in which said rollers are adapted to be displaceably guided, a shifting device adapted to displace said rollers in said guide within two limiting positions and thus to alter the gear ratio, a crank disc mounted on the part containing said guide and offset to said guide, an operating member for driving said crank disc, a crank pin on said crank disc, and, for displacing said rollers in said guide, a connecting rod hinged, on the one hand, to a journal of one of the rollers and, on the other hand, to said crank pin.

4. A friction-wheel regulating gear according to claim 2, comprising a crank disc mounted on the part containing said guide and offset to said guide, an operating member for driving said crank disc, a crank pin on said crank disc, and, for displacing said rollers in said guide, a connecting rod hinged, on the one hand, to a journal of one of the rollers and, on the other hand, to said crank pin.

5. A friction-wheel regulating gear according to claim 3, comprising a self-stopping reduction gear between said operating member and said crank disc.

6. A friction-wheel regulating gear comprising two coaxial spaced cone discs, one of said cone discs being adapted to be driven by a driving machine and the other of said cone discs being adapted to drive a driving shaft, a friction-wheel transmission device adapted to alter the gear ratio and displaceably arranged between said discs, the driving-side part and the driven-side part of said regulating gear and said friction-wheel transmission device being each constructed as a structural unit, said friction-wheel transmission device comprising two discs each with a friction-bead and coupled together with regard to rotation but axially displaceable in relation to each other, one of said beads lying on a point on a conical-surface line of the driving-side cone disc and the other of said beads lying on a point on a conical-surface line of the driven-side cone disc which latter conical-surface line lies opposite and parallel to said conical-surface line of the driving-side cone disc, spring means for urging said beads apart and against said two cone discs, contact of said beads with said cone discs being adapted to take place on said conical-surface lines, a supporting ring in which said discs are mounted, rollers on which said supporting ring is arranged, a guide which is parallel to said conical-surface lines of said cone discs and in which said rollers are adapted to be displaceably guided, and a shifting device adapted to displace said rollers in said guide within two limiting positions and thus to alter the gear ratio, said rollers being rotatable about the axis of said guide in such a manner that said supporting ring is rockable between said two cone discs with said displaceable discs.

7. A friction-wheel regulating gear compristwo coaxial spaced cone discs, one of said cone discs being adapted to be driven by a driving machine and the other of said cone discs being adapted to drive a driving shaft, a friction-wheel transmission device adapted to alter the gear ratio and displaceably arranged between said discs, the driving-side part and the driven-side part of said regulating gear and said friction-wheel transmission device being each constructed as a structural unit, said friction-wheel transmission device comprising two discs each with a friction-bead and coupled together with regard to rotation but axially displaceable in rotation to each other, one of said beads lying on a point on a conical-surface line of the driving-side cone disc and the other of said beads lying on a point on a conical-surface line of the driven-side cone disc which latter conical-surface line lies opposite and parallel to said conical-surface line of the driving-side cone disc, spring means for urging said beads apart and against said two cone discs, contact of said beads with said cone discs being adapted to take place on said conical-surface lines, a supporting ring in which said discs are mounted, rollers on which said supporting ring is arranged, a guide which is parallel to said conical-surface lines of said cone discs and in which said rollers are adapted to be displaceably guided, a shifting device adapted to displace said rollers in said guide within two limiting positions and thus to alter the gear ratio, the shaft of at least one cone disc being mounted so as to be axially displaceable, a pressure plate against which said shaft bears, said pressure plate being arranged so as to be axially displaceable, a closed chamber behind said pressure plate and an elastic buffer in said closed space.

8. A friction-wheel regulating gear according to claim 2, the shaft of at least one cone disc being mounted so as to be axially displaceable, said friction-wheel regulating gear also comprising a pressure plate against which said shaft bears, said pressure plate being arranged so as to be axially displaceable, a closed chamber behind said pressure plate and an elastic buffer in said closed space.

9. A friction-wheel regulating gear according to claim 1, comprising a casing for said gear, said casing having apertures at the two ends thereof and a fan blade carried on the periphery of one of said cone discs and adapted to produce through said apertures a current of air for ventilating said gear.

10. A friction-wheel regulating gear according to claim 2, comprising a casing for said gear, said casing having apertures at the two ends thereof and a fan blade carried on the periphery of one of said cone discs, and adapted to produce through said apertures a current of air for ventilating such gear.

ERNST KREBS.

REFERENCES CITED

The following references are of record in the file of this patent:

UNITED STATES PATENTS

| Number | Name | Date |
|---|---|---|
| 1,127,166 | Beugler | Feb. 2, 1915 |
| 1,229,401 | Black et al | June 12, 1917 |
| 2,019,006 | Ferrari | Feb. 1, 1934 |
| 2,325,323 | Johnson et al | July 27, 1943 |

FOREIGN PATENTS

| Number | Country | Date |
|---|---|---|
| 824,593 | France | Nov. 10, 1937 |